March 25, 1924.
C. LUNDIN
APPARATUS FOR PRODUCING GAS
Filed Dec. 22, 1921
1,487,869
7 Sheets-Sheet 1
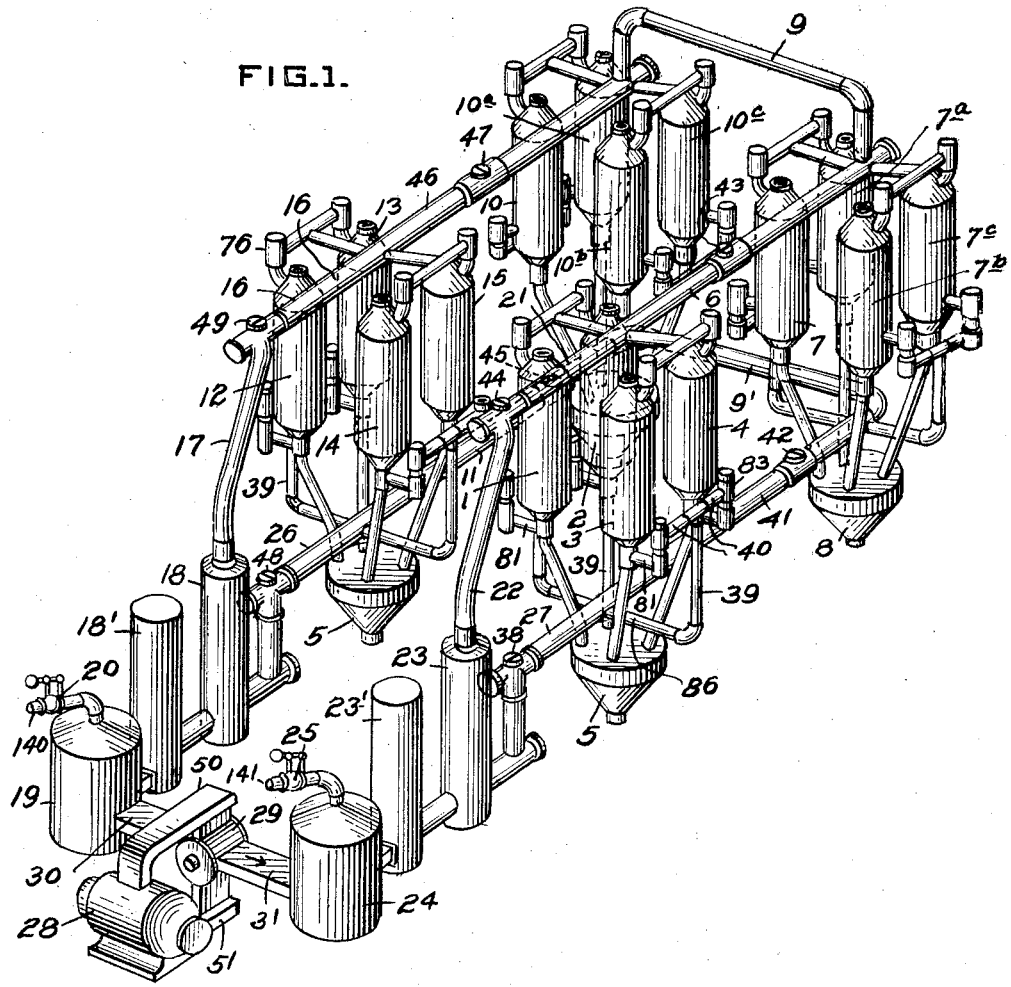
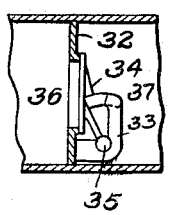
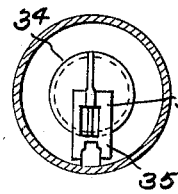
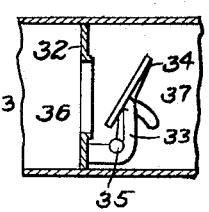
WITNESSES
J. Herbert Bradley.
INVENTOR
Carl Lundin
By Winter & Brown
his attys.

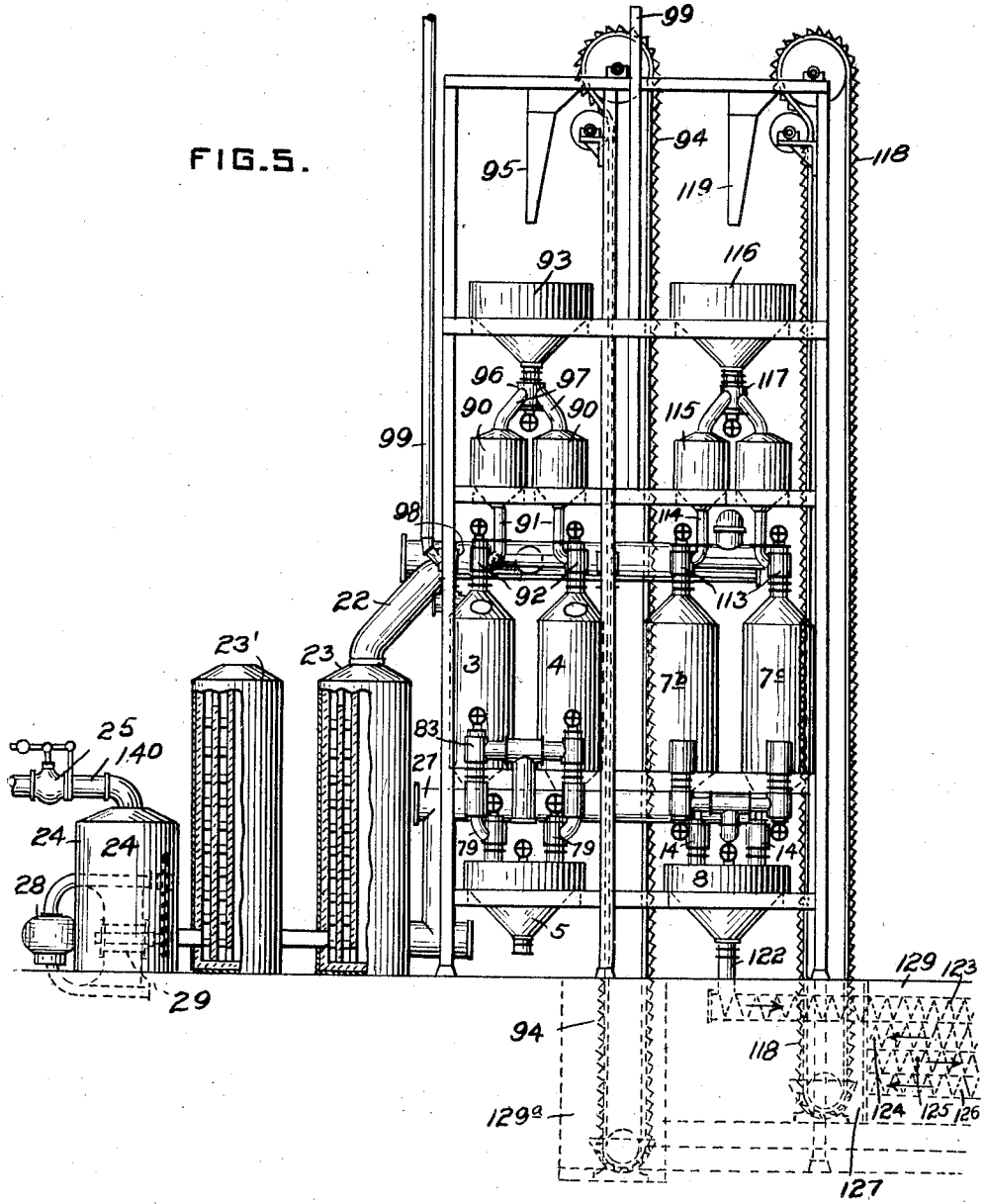

March 25, 1924.

C. LUNDIN 1,487,869

APPARATUS FOR PRODUCING GAS

Filed Dec. 22, 1921

WITNESSES

INVENTOR
Carl Lundin

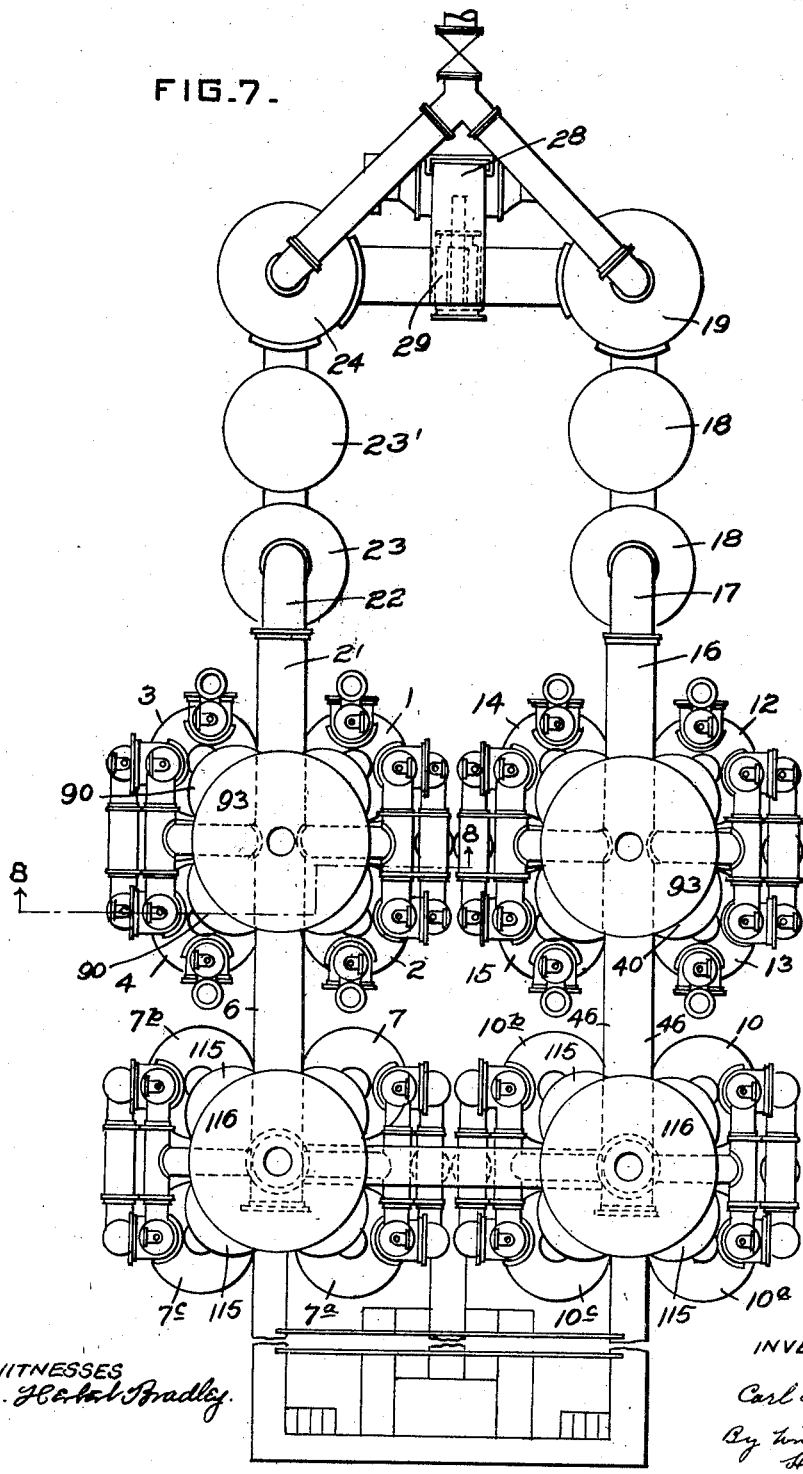

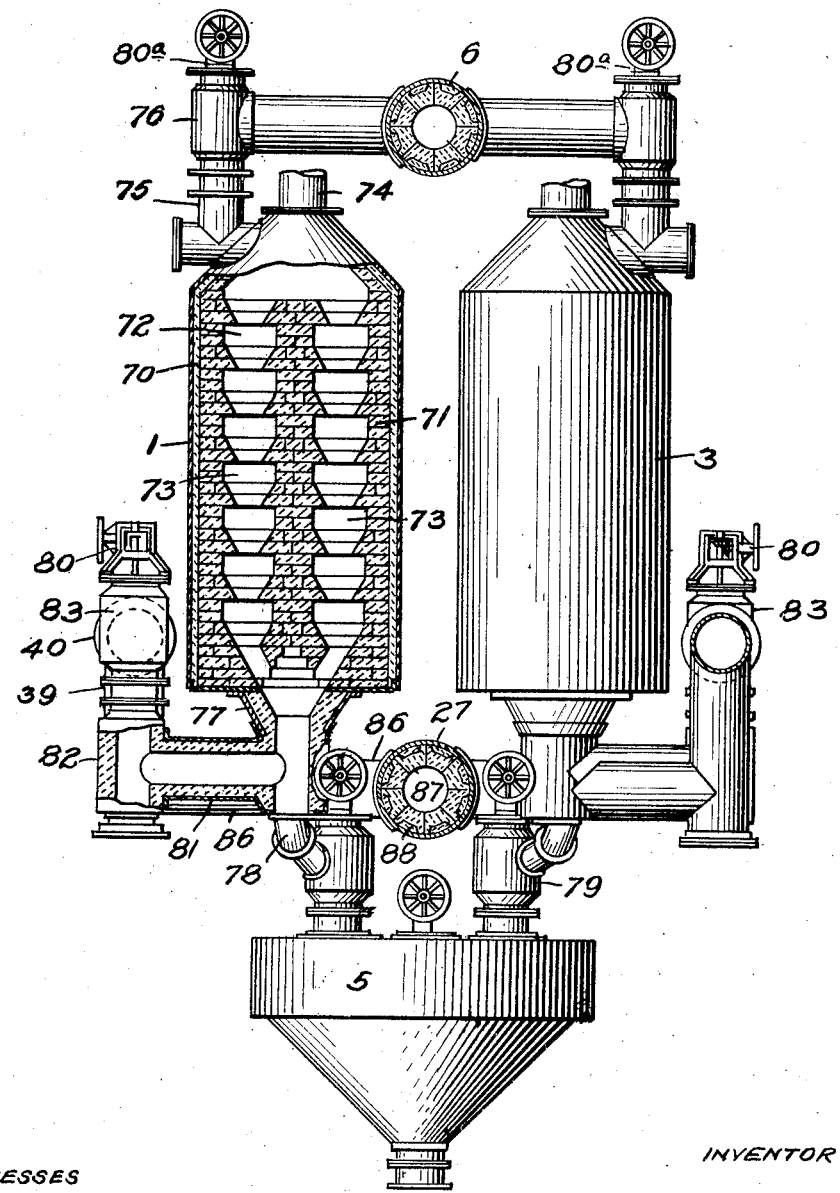

March 25, 1924.  1,487,869
APPARATUS FOR PRODUCING GAS
Filed Dec. 22, 1921   7 Sheets-Sheet 6
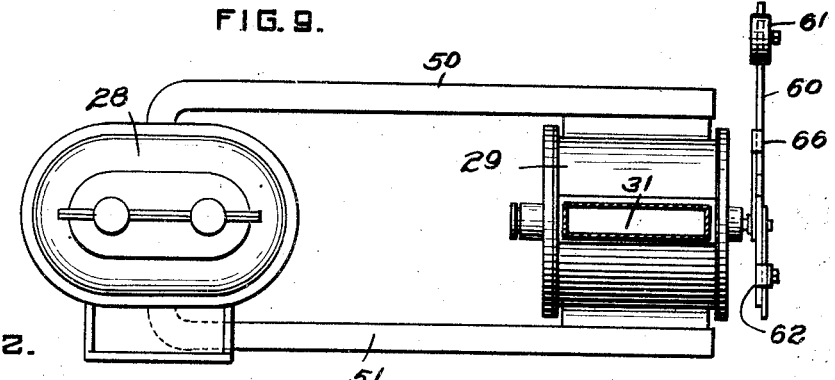
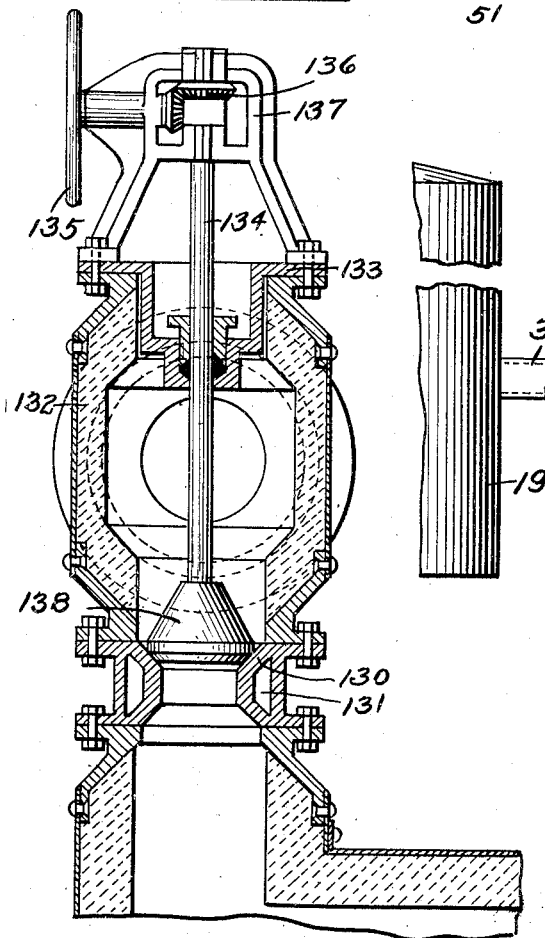
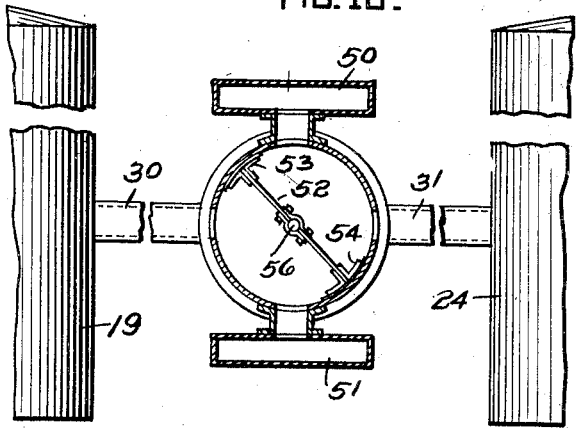
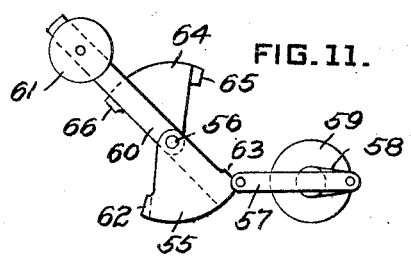
INVENTOR
Carl Lundin
By Winter & Brown
his Attys.

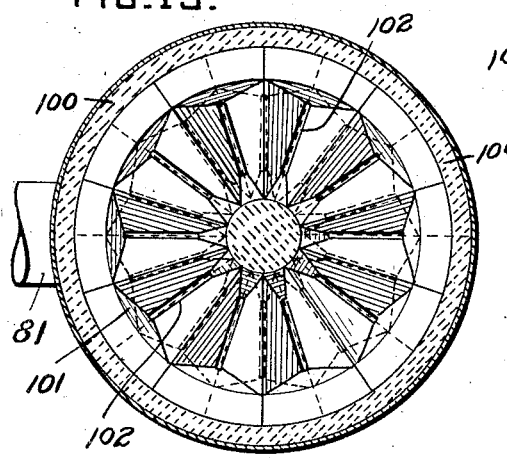
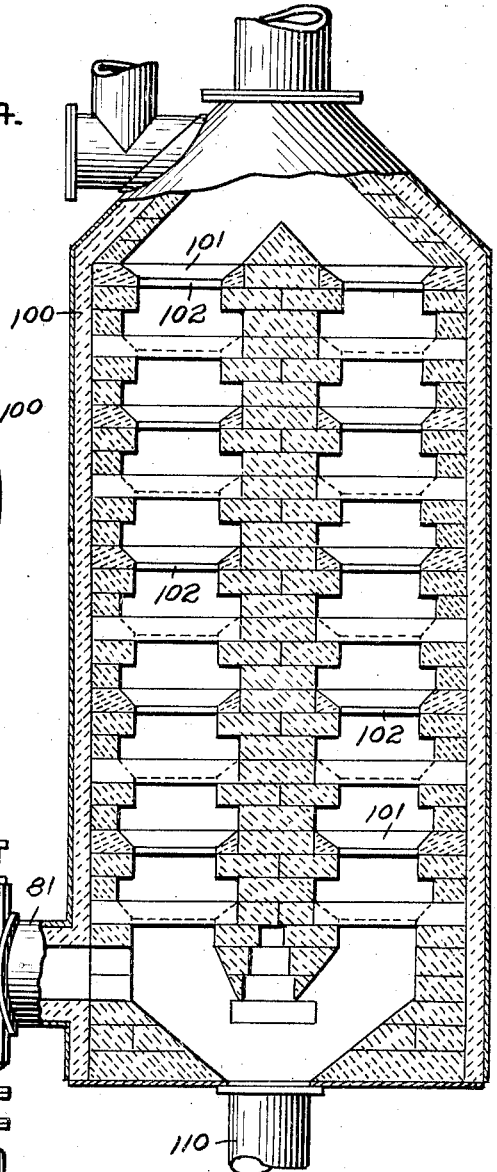
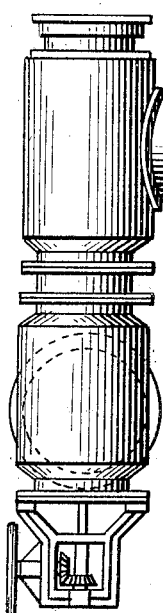

Patented Mar. 25, 1924.

1,487,869

UNITED STATES PATENT OFFICE.

CARL LUNDIN, OF PITTSBURGH, PENNSYLVANIA.

APPARATUS FOR PRODUCING GAS.

Application filed December 22, 1921. Serial No. 524,331.

*To all whom it may concern:*

Be it known that I, CARL LUNDIN, a citizen of the United States, and a resident of Pittsburgh, in the county of Allegheny, and State of Pennsylvania, have invented a new and useful Improvement in Apparatus for Producing Gas, of which the following is a specification.

The invention relates to apparatus for producing gas.

One of the objects of the invention is to provide an improved apparatus by means of which gas, rich in carbon monoxid and hydrogen, may be efficiently produced.

Another object is to provide an improved gas producing apparatus which is automatic and continuous in its operation and which generates sufficient heat within itself to carry out the processes involved in the gas manufacture.

A further object of the invention is to provide an apparatus of the kind referred to in which the several units constituting the distillation retorts and the combustion chambers may be connected or disconnected from the system at will for the purpose of economy and for securing a balancing of the system.

It is also an object to construct the retorts and combustion chambers by a proper laying of the brick of which they are made so as to obviate the use of special supporting devices and to reduce the cost of construction.

Other objects and advantages of the invention will appear from the following specification.

A system similar to the one disclosed herein having but a single pair of large combustion chambers and a single pair of regenerators was described and claimed in my prior application Serial No. 473,045 filed May 27, 1921, of which this application is a continuation in part.

The accompanying drawings illustrate an embodiment of the apparatus. The views of the drawings are as follows:—

Fig. 1 is a perspective view diagrammatically illustrating the main elements comprising the apparatus.

Fig. 2 is a partial cross section and side elevation of the check valve used with the apparatus showing the check valve in closed position.

Fig. 3 is an end elevation of the check valve.

Fig. 4 is a partial cross section and side elevation of the check valve, showing the valve in open position.

Fig. 5 is a side elevation of the apparatus.

Fig. 7 is a top view of the apparatus.

Fig. 8 is an end elevation and partial cross section of a portion of the apparatus on the line 8—8 of Fig. 7.

Fig. 9 is a side elevation of the pump and butterfly valve used with the apparatus.

Fig. 10 is a vertical section through the butterfly valve.

Fig. 11 is a side elevation of the mechanism for operating the valve.

Fig. 12 is an elevation and partial vertical section of one of the valves used in the apparatus.

Fig. 13 is a horizontal cross section through one of the oxid or combustion chambers.

Fig. 14 is a vertical cross section of one of the combustion chambers.

Figure 6:
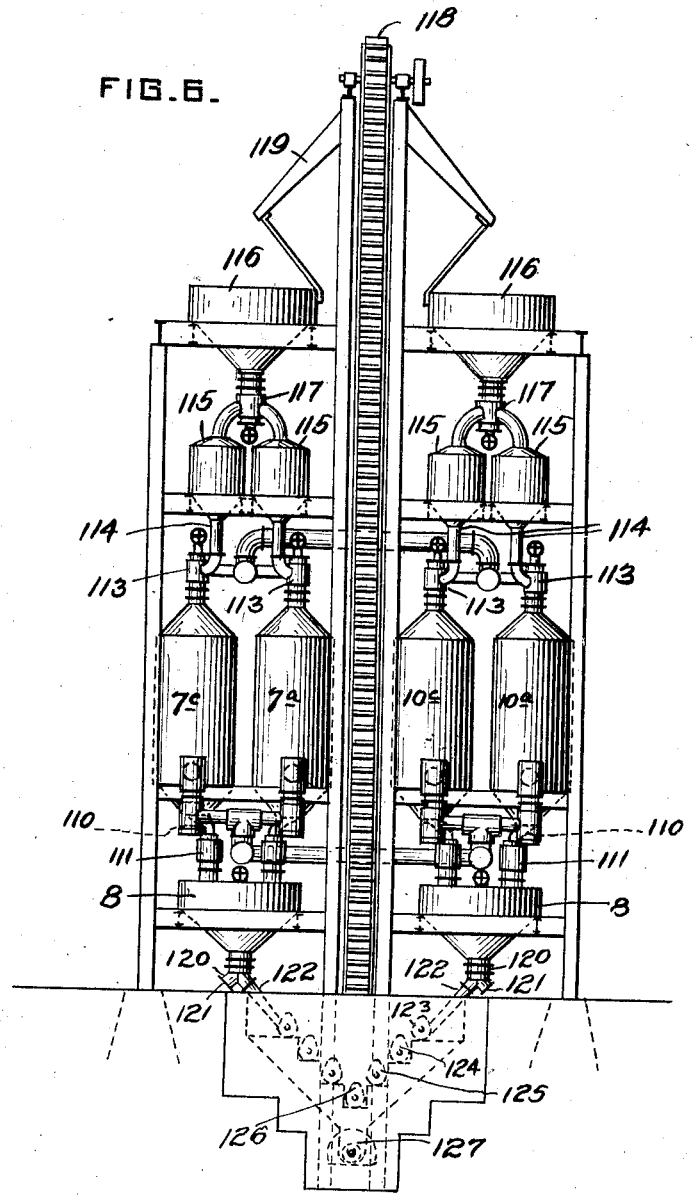
Fig. 6 is an end elevation thereof.

In order to understand the structure and operation of the apparatus, it will first be generally described by explaining briefly the process employed in the manufacture of the gas and by referring to the diagrammatic illustration of the apparatus in Fig. 1.

The process comprises, generally speaking, the destructive distillation of carbonaceous material, such as coal, to produce carbon monoxid ($CO$), hydrogen ($H_2$), and other gases, the subjecting of these gases to the action of metallic oxides, such as the magnetic oxid of iron ($Fe_3O_4$), to change the carbon monoxid to carbon dioxid ($CO_2$) and thereby produce heat for carrying out the entire process, and the subsequent passing of the carbon dioxid over heated carbonaceous material to reduce it to carbon monoxid. Air is excluded from the process in order to prevent the gas having a non-combustible nitrogen component.

The apparatus for carrying out this process includes suitable retorts, receptacles, tanks, regenerative chambers, piping, pumps, and valves to form a closed system which operates continuously and automatically and produces within itself sufficient heat to carry out the process in all of its phases.

The apparatus illustrated is of the reversible regenerative type and comprises two sets of coal retorts, combustion chambers, and regenerators. The retorts in which the coal is distilled are arranged to be heated by the heat generated in the production of the gas, as hereinafter described.

One set of coal retorts is composed of group 1, 2, 3, and 4, provided with coal charging valves at their tops and arranged at their bottoms to discharge the ash and other residue into a hopper 5. The gas generated in these retorts passes from their tops through the conduit 6 to the combustion chambers 7, $7^a$, $7^b$, and $7^c$ containing a metallic oxid, such as the magnetic oxid of iron hereinbefore mentioned, and which chambers are arranged to have the oxid introduced into it at the top in a small stream, and the iron remaining after the oxygen has been removed to be discharged into a bottom hopper 8, the charging and discharging openings being controlled by valves hereinafter described. The gas generated in the coal retorts is rich in carbon monoxid and when it enters the chambers 7 to $7^c$ the carbon monoxid takes up oxygen from the metallic oxid, forming carbon dioxid. Hence combustion takes place within the chambers and produces a very considerable amount of heat which is utilized to heat the regenerators 18, 18′, 23, and 23′ hereafter referred to, and when the gas is reversed is utilized to heat the second set of coal retorts and also the entire system.

From oxid chambers 7 to $7^c$ the gas flows through the conduits 9 and 9′ connected to their upper and lower ends respectively into the oxid chambers 10, $10^a$, $10^b$, and $10^c$, similar to chambers 7 to $7^c$, in which the gases are further subjected to the action of iron oxid to furnish oxygen for the chemical reaction. Both sets of oxid chambers are connected through the valve controlled branch pipes to the upper and lower gas conduits so that as many chambers as are desired may be connected or disconnected from the system. As illustrated the number of oxid chambers corresponds to that of the distillation retorts. Such an arrangement makes it possible to cut into or out of the system any desired number of retorts or combustion chambers thus securing economical operation and an exact balancing of the system. The gases flow from the bottom of oxid chambers 10 to $10^c$ through conduit 11 (shown in dotted lines in Fig. 1), and thence through a second set of coal retorts 12, 13, 14, and 15, similar to the retorts 1, 2, 3, and 4, and also provided with an ash hopper 5. From the top of the second set of retorts the gas flows through conduits 16 and 17 to regenerative chambers 18 and 18′ containing checker work for absorbing heat. From these chambers the gases pass to a storage receptacle 19 from which they are discharged from time to time through a relief valve 20 to a suitable gas storage tank.

The top of the first set of coal retorts is also connected through conduits 21 and 22 with regenerative chambers 23 and 23′ and a receptacle 24, similar to the connections from the second set of coal retorts already described, and which receptacle 24 has an automatic relief valve 25 through which the gas discharges from time to time to a suitable storage tank.

The regenerative chambers 18, 18′, and 23, 23′, are connected, respectively, by conduits 26 and 27, with the bottom of the two sets of coal retorts, so that gas may be passed from either pair of regenerative chambers upwardly through the coal retorts. Suitable check valves, hereinafter described, are provided so that the gas can be circulated in either direction, that is to say, from receptacles 23, 23′, through the first set of coal retorts and thence through oxid chambers 7 to $7^c$ and 10 to $10^c$, thence through the second set of coal retorts, and finally to receptacles 18, 18′, or in the reverse direction.

The gas is circulated in the apparatus by means of a suitable power-driven pump 28 which is connected to a butterfly valve 29 that in turn communicates by the rectangular conduits 30 and 31 with the receptacles 19 and 24. The pump operates continuously in one direction and the valve is automatically and periodically reversed so as to reverse the direction of flow of the gas throughout the apparatus, the flow being maintained at about the rate of not over 40 ft. per second. This valve is timed so that the gas passes entirely from one of the receiving tanks to the ore chambers and back again, whereby it is thoroughly subjected to the action of both the coal and the iron oxide.

It will thus be seen that two substantially symmetrical sets of coal retorts, ore or combustion chambers and receptacles have been provided which are connected together and associated with a pumping apparatus so that gas may be caused to flow from one to the other.

The flow of gases through the apparatus is directed by automatic check valves which are located at various points in the system. These check valves are of novel construction, shown in Figs. 2, 3, and 4. Each valve comprises a frame 32 arranged to fit within a conduit and having a projecting bearing portion 33 to which a valve member 34 is pivoted at the point 35.

The lower or pivot end of the movable member is enlarged and fits within a socket in the bearing 33 and consequently there are no pivot pins to wear out, as is usual in the ordinary types of flap valves.

The valve, which is shown in closed position in Fig. 2, is moved to open position whenever the gas pressure on the side 36 exceeds that on the side 37, in which case the valve member 34 occupies the position shown in Fig. 4. This structure reduces the tendency of the valve to vibrate and also provides a structure that will not wear out rapidly.

For convenience in describing the apparatus the valves are indicated in Fig. 1 by circles on the conduits with a line through their center. When this line is parallel with the conduit it indicates that the valve is open, and when it is at right angles to the conduit, that the valve is closed.

Assuming that the gas first flows through the first set of coal retorts 1, 2, 3, and 4, the circulation is as follows: From the pump 28 the gas is forced through receptacle 24 and thence to the regenerators 23, 23'. A check valve at 38, located in conduit 27 is forced open by the gas, permitting the gas to flow past the same and upwardly through the vertical pipes 39 and the horizontal pipes 40 to the bottoms of the first set of coal retorts. Flow of gas through the pipe 41 to the oxid chambers 7 to 7$^c$ is prevented by check valve 42, which under these conditions is closed. From the top of the coal retorts the gas flows through pipe 6 past check valve 43, which normally opens under these conditions, to the oxid chambers 7 to 7$^c$. The direct flow of gas from the pipe 6 to the regenerative chamber 23, through pipe 22, is prevented by a check valve 44 so arranged that it closes when the gas tends to flow through the apparatus in this direction. A portion of the gases flows downwardly through the oxid chambers 7 to 7$^c$ and thence through branch pipes, corresponding to branches 40 and 39 of the coal retorts, to conduit 9' which connects with conduit 11, while the remaining portion flows through conduit 9 to the upper ends of chambers 10 to 10$^c$ and thence downwardly therethrough to conduit 11. The gases then flow through the conduit 11 and past the check valve 45 (shown in dotted lines in Fig. 1), said check valve being in open position under these conditions. The flow of gases from the top of chambers 10 to 10$^c$ through conduit 46 is prevented by a check valve 47 which is closed when the gases tend to flow in this direction. From conduit 11 the gases pass upwardly through the second set of coal retorts 12, 13, 14, and 15. They are prevented from passing directly to the regenerative chambers 18, 18' through the conduit 26, by a check valve 48 in said latter conduit which is closed when the gases tend to flow in this direction. From the top of the second set of retorts the gases flow from the conduit 16, past the check valve 49 which opens under these conditions, and thence to the regenerative chambers 18, 18', thence to receptacle 19, and back to the inlet side of the pump.

It will thus be observed that when the butterfly valve 29 is in such a position that the pump tends to cause a flow of gases from regenerative chambers 23, 23', the gases, by reason of the arrangement of the conduits and the location of the check valves, are caused to flow upwardly through the first set of coal retorts to the top of the first group of ore chambers. A portion thereof then flows downwardly through said chambers and by way of conduit 9' to conduit 11, and the remaining portion across to the top of the second group of ore chambers by way of pipe 9 thence downwardly through said second group of ore chambers to conduit 11, and upwardly through the second set of coal retorts and downwardly into the regenerative chambers 18, 18' to the receptacle 19. When the butterfly valve is reversed so that the gases are caused to flow from chamber 19, the flow is through the conduit 26, upwardly through the second set of retorts 12 to 15 to the top of the ore chambers 10 to 10$^c$. A portion flows downwardly through these chambers and by pipe 9' to the conduit 11. The remaining portion flows by way of pipe 9 thence downwardly through chambers 7 to 7$^c$ to conduit 41, the combined gases passing through conduit 41 to the bottom of the first set of coal retorts upwardly therethrough, and downwardly into the regenerative chambers 23, 23' to the receptacle 24. The check valves thus automatically cause the gas to flow in the proper direction and prevent it from flowing in the wrong direction whenever the butterfly or reversing valve is operated.

Both sets of coal retorts are constructed, as will be later explained, so that when hot gases are passed therethrough the excess heat of the gases is absorbed and stored in the walls of the retorts to be subsequently given up to aid in the process of producing gas. The combustion in the ore chambers 7 to 7$^c$ and 10 to 10$^c$ causes the generation of heat in excess of that required for the chemical reactions. This excess of heat is absorbed in the coal retorts when the gases are caused to flow from the ore chambers to the retorts under the action of the pump and the reversing valve. The excess heat which is not absorbed and stored in the coal retorts is absorbed and stored by the checker work in the regenerative chambers 18, 18' and 23, 23', such heat being reconveyed to the gas when the direction of flow is reversed.

The apparatus is arranged to operate continuously, suitable arrangements being made for charging and discharging the retorts and ore chambers. In order to first start the apparatus, however, it is necessary to heat it to a temperature of about 800° Fahr. which can be conveniently done by starting the fire in the retorts and producing the necessary heat by the direct combustion of the coal itself.

Assuming that the apparatus has been started and that gas is being generated in the first set of coal retorts by the distillation of the coal therein, such gas flows to the ore chambers 7 to 7ᶜ and 10 to 10ᶜ, where it comes into contact with the iron oxide causing combustion to take place and producing sufficient heat to raise the gas to a temperature of not over 800° Fahr. At this point, the direction of flow of the gases is reversed. They consequently remain stationary for an instant in the combustion chamber and then are returned to the coal retorts where their heat is absorbed by the coal in the retorts and by the walls of the retorts so that the retorts are in fact raised to a proper temperature for the continuous and successful operation of the apparatus.

When the direction of flow of the gases is reversed, the gases generated in the second set of coal retorts are passed from said retorts to the oxide chambers where they combine with the oxygen in the iron oxide, causing combustion which produces excess heat. Upon the second reversal these gases are caused to flow back to the second set of coal retorts where their heat is absorbed by the coal and by the retorts and the carbon dioxid changed to carbon monoxid. It will accordingly be clear that the excess heat generated in the oxide chambers is used to heat the coal retorts and the coal therein to enable the process to be automatically carried on without the use of external heat.

Further interchange and conservation of heat to make the process automatic, continuous, and self-contained, is secured by the regenerative chambers 18, 18′, and 23, 23′, the hot gases flowing out therethrough raising the checker work to a high temperature, which in turn gives up its heat to any of the gases forced therefrom to the iron retorts.

The construction of the various elements of the system will now be explained:—

The reversing valve for reversing the direction of flow of the gases is shown in detail in Figs. 9, 10, and 11. The valve is connected at its top and bottom by conduits 50 and 51 respectively with the pump 28, the latter being of any suitable type driven by a gas engine or other driving means. The conduits 30 and 31 leading to the receptacles 19 and 24 are connected so as to communicate with the valve housing at right angles to the connections of the conduits 50, 51, leading to the pump. A movable vane 52 is pivoted within the valve, said vane carrying members 53 and 54 on its ends so that as the vane is moved past the openings leading to the pump the openings will be substantially closed for an instant. This structure prevents the forcing back of the gas into the apparatus, when the vane, in moving from one position to the other is passing the gas ports or in case the valve should be stopped in an intermediate position.

The movable member or vane 52 of the reversing valve is operated by mechanism shown in Fig. 11. This mechanism includes a sector 55 pivoted loosely to a shaft 56 and arranged to be oscillated by means of a connecting rod 57 pivoted to a crank shaft 58 that is rotated continuously by a wheel 59 driven by any suitable means. Also, pivoted loosely to the shaft 56 is an arm 60 carrying a weight 61 on its upper end and co-operating at its lower end with projections 62 and 63 on the sector 55. A second sector 64 is directly connected to the shaft 56 carrying vane 52, this sector also carrying projections 65 and 66 which are arranged so that when the arm 60 contacts with them then the sector 64 is actuated to move the vane 52 of the valve.

The operation of this valve is as follows:—

Assuming the mechanism to be in the position shown in Fig. 11, as the crank 58 continues to rotate, the rod 57 pushes the sector 55 and the lower end of the arm 60 to the left until the weight 61 carried by the arm passes a vertical line through the shaft 56, whereupon the weight suddenly moves the arm 60 to its right-hand position. In so doing the arm strikes the projection 65 on the sector 64 and thereby suddenly moves the vane 62 to its reverse position. As the crank 58 continues to rotate the reverse action takes place, the sector 55 and the lower end of the arm 60 being drawn to the left until the weight 61 passes a vertical line through the shaft 56, whereupon the arm 60 is moved suddenly to the left and the sector 64 and the vane 52 moved to the reverse position.

This structure insures a periodic, positive, and sudden reversal of the direction of flow of the gases. With the vane in the position shown in Fig. 10 the flow is from the pump conduit 51 through the valve casing and out through the conduit 30 to the receptacle 19, the return being through the conduit 31, the valve and the conduit 50 to the pump. When the vane is reversed the flow is from the pump conduit 51, through the valve casing and out through conduit 31 to the receptacle 24, the return being through the conduit 30, the valve casing and the conduit 50 to the pump. The pump thus operates continuously in the same direction but its action in directing the flow of gas in the apparatus is periodically reversed.

The construction of the coal retorts and their connection to the conduits of the apparatus and the discharge hopper are illustrated in Fig. 8. Each of the retorts is of the same construction and therefore only one will be described.

The retorts are preferably made out of sheet metal and cylindrically shaped, having a length considerably greater than their diameter. The interior of each of the retorts is lined with a heat-insulating magnesia lining 70 which prevents any material loss of heat from the retorts by radiation. The remainder of the interior of the retort is filled with fire brick or other refractory material 71 through which passages 72 are provided for the reception of the carbonaceous material or coal, these passages having truncated conical hoppers 73 therein formed by proper laying of the brick.

These hoppers prevent the coal from entirely filling the passages. They cause pockets to be formed in which gas may accumulate and which permit the gas to come into better contact with the coal than if it were packed tightly in the passages and entirely filled them. These passages communicate at the top of the receptacle with a conduit 74 through which they are charged, and also with a conduit 75 and a valve 76 through which the gases flow to the upper gas conduits 6 or 46. When the hot gases flow through the retort passages, the heat is absorbed by the firebrick interior of the retorts and stored therein, the firebrick being capable of readily absorbing and retaining heat. Loss of this heat by radiation is prevented by the magnesia lining.

The passages in the retort communicate at the bottom thereof with a conduit 77 which is connected to a conduit 78 leading to a valve 79 which in turn is connected to the discharge hopper 5, this hopper serving as a discharge hopper for all four of the retorts of the set.

A hand valve 80 is provided in the connection of the gas conduit to the bottom of each of the coal retorts, and a similar valve 80ª is provided from the gas connections to the tops of each of the coal retorts, by means of which any one or more of the retorts of the group can be cut out of the circulation. Consequently it is possible to vary the capacity of the plant without in any way decreasing the efficiency of the individual retort.

The conduit 77 leading from the bottom of the retort also communicates with a horizontal conduit 81 connected to the vertical conduit 82 connected through a valve 83 with a horizontal conduit 40 communicating with a second vertical conduit 39 which in turn communicates with a second horizontal conduit 86 leading to the central or main conduit 27. The arrangement of these conduits, as illustrated in Fig. 8, will be clear by reference to Fig. 1, where they are shown diagrammatically.

The conduits are all lined to prevent radiation and loss of heat. The manner in which this lining is constructed is illustrated in the cross section of conduit 27 in Fig. 8. Blocks 87 of firebrick are fitted into the conduit, as shown, each block surrounding a plate or strip of magnesia 88, the latter serving as a heat insulating medium.

Each coal retort of the set communicates with the discharge hopper for that set through a valve and also with the lower gas conduits 26 or 27 through a valve so that communication from the retort to the discharge hopper or to the gas conduit may be controlled at will. Communication from the coal retorts to the upper gas conduits 6 or 46 and communication with the coal charging conduits is also controlled by suitable valves so that the gas conduit and charging conduit may be shut off when desired.

The retorts are charged with coal from storage tanks 90, there being a storage tank for each retort. The number and size of these storage tanks may be varied to suit the requirements. As shown, each of the tanks communicates through a conduit 91 and a valve 92 with the top of the retort. Whenever the valve 92 is open, coal is permitted to pass from the storage tank 90 into the respective retort connected therewith.

Coal is supplied to the storage chambers 90 from the hopper 93 to which it is conveyed by a bucket conveyor 94 which discharges into a chute 95. The coal in the hopper 93 passes through a valve 96 which directs it into conduits 97 leading to the storage chambers.

When it is desired to charge the coal retorts the valve 96 is opened and the storage tanks 90 filled with coal from the hopper 93, each storage chamber containing the proper quantity of coal for a single charge of the respective retort connected thereto. The valve 96 is then closed to prevent air entering the storage chambers 90 when the coal is taken out of them. The valves 83 and 76 leading to the gas conduits are then closed, the valve 79 leading to the discharge hopper also being closed. The valves 92 from the storage chambers 90 are then opened, permitting the charges in the storage chambers to flow into the retorts.

After the retorts are charged, the valves 92 are closed and the gas valves again opened, permitting the system to again be operated. The valve 96 is subsequently opened to charge the storage chambers so that they are ready for another charge of the retorts. In actual operation the various coal retorts of each set are charged successively, each retort being arranged so that one retort is charged every two hours.

When it is desired to discharge the ashes or other residue in the coal retorts the valves 83 and 76 leading to the gas conduits are closed and the valve 79 leading to the discharge hopper 5 opened, thereby permitting the ashes to discharge into the hopper, at the same time preventing any other communication with the coal retort. After the ashes have been discharged the valve 79 is closed and the retorts charged with coal, as above described, after which the gas valves are opened and the apparatus is again in condition for operation.

In starting the apparatus it is necessary to first heat the coal retorts. For this purpose, each retort has at its top, as shown in Fig. 5, a valve 98, connected to a chimney 99. When it is desired to heat the retorts in starting the production of gas, the chimney valve 98 is opened and all the other valves to the retort are closed, with the exception of the valves leading to the ash discharge port at the bottom of the retort. Combustion is then started in the coal by any suitable means, and is supported by air drawn in through the ash port, and the excess gas of combustion passes out the chimney valve. When the retorts have been heated sufficiently by the actual combustion of the coal, the chimney valve is shut off, and the ash ports are closed to prevent entrance of additional air, after which the apparatus is in condition for operation in the normal manner herein described.

The combustion chambers 7 to $7^c$ and 10 to $10^c$ are also made of sheet metal and of cylindrical shape. They are shown in end elevation in Fig. 6 and in detail in Figs. 13 and 14.

Each of the combustion chambers is provided with a heat insulated lining 100 and contains a plurality of sets of ore receiving and retarding pans, as illustrated in Figs. 13 and 14. These pans are composed of specially shaped refractory bricks or blocks 101, which have radially disposed openings 102 therethrough, the small end of the opening being located at the bottom of the block. These blocks are built into and supported by suitably building up the brickwork of the outer wall and central column of the chamber as clearly shown in Figs. 13 and 14. The successive pans are located relative to one another so that the openings through the refractory blocks are staggered with relation to one another, thereby providing a series of irregular passages from the top to the bottom of the ore pans, these passages causing the ore to be thoroughly distributed and causing a maximum amount of the ore to be exposed to the gas in the chamber.

The bottoms of the oxid chambers communicate with conduits 110 which are connected through valves 111 with discharge hoppers 8. The tops of the chambers communicate through valves 113 and conduits 114 with the storage receptacles 115 which are furnished with iron óxid from the hopper 116 through the distributing valve 117. Iron oxid is conveyed to the hopper 116 by the bucket conveyor 118 which discharges into the chute 119.

In charging the combustion chambers the storage receptacles 115 are first filled with oxid by opening the distributing valve 117, which allows oxid to flow from the hopper 116 into the four storage receptacles and entirely fill them. The valve 117 is then closed and the respective valves 113 are opened to allow the oxid to pass into the combustion chambers in a continuous stream. The valves 113 are not opened to permit the oxid to rapidly pass into the chamber and immediately fill the passages. Instead, they are opened just sufficiently to permit the oxid to continually flow into the chambers in a small stream, thereby continually furnishing new oxid for supplying oxygen to the gases and also obtaining a maximum exposure of the oxid to the gases. Any desired number of the chambers may be connected or disconnected from the system by operation of the valves 113.

Ordinarily the four storage receptacles 115 are charged and discharged in timed relation in the actual operation of the apparatus. Instead of filling all four receptacles of a set and then discharging them into the combustion chambers, one receptacle is filled approximately every hour, thereby making the process of charging and discharging a continuous one.

The separation of the oxygen from the iron oxid in the combustion chambers leaves pure iron in finely divided particles which is discharged from time to time into the hoppers 8. This iron is heated and as soon as it is exposed to the atmosphere it again takes up oxygen to form iron oxid which may be used over again. It is important however, to conserve the heat of the iron and for this purpose the following construction has been provided for utilizing the heat of the iron to heat the coal that is carried to the coal retorts.

The discharge hoppers 8 from the combustion chambers are connected to valves 120 which have discharge openings 121 by means of which the iron may be discharged to any suitable receptacle. The valves also have discharge chutes 122 which discharge into ore drums 123. Each of these ore drums contains a screw conveyor and the drums are located relative to other ore drums 124, 125, and 126 so that the iron is first conveyed to the drums 123 and carried the length thereof, from which it is discharged into the drums 124 and carried back through the length of this second drum, whereupon it is discharged into the third drum 125, and so on, until it reaches the last drum 126 which discharges into a pocket 127, from which the bucket conveyer 118 carries the iron which has now been converted into iron oxid by exposure to the atmosphere to the chute 119, where it is discharged into the charging hopper 116.

The ore drums are located within a coal-receiving pocket 129 which is normally kept filled with coal for charging the coal retorts. The heat caused by the reoxidizing of the iron as it passes through the ore drums is communicated to the coal to raise its temperature and thereby prepare it for the destructive distillation process in the coal retorts. The bucket conveyer 94 is in communication with the coal pocket 129$^a$ and conveys the coal to the chute 95 which discharges into the receiving hopper 93.

By the above construction the heat of the iron as it is discharged from the combustion chambers is communicated to the coal and thereby contributes to the efficiency of the process.

The sulphur of the coal burns and is carried into the ore chambers, in the form of gases and vapors, where coming in contact with oxygen, it is converted into sulphur dioxide ($SO_2$), and this unites with water vapor present in the gases, forming sulphurous acid, which is heavier than the carbon gases, and is consequently discharged with the iron ore from the bottom of the oxidizing chamber. The acid evaporates while the ore is being reoxidized.

The sulphurous acid which is produced in the combustion chambers discharges with the iron into the hoppers and the heat resulting from the oxidization of the iron causes it to be broken up, forming sulphur dioxid ($SO_2$), and steam, thereby freeing the iron of the sulphur and producing an iron oxid which is very suitable for use in again charging the combustion chambers.

The valves used throughout the system are of special construction and are particularly adapted to contribute to the success of the apparatus. The valves used in connection with the retorts and the combustion chambers are similarly constructed, the ones on the combustion chambers being merely turned downwardly instead of upwardly and have their conduits 81 connected to the side of the chamber instead of to the vertical conduits 77. Such arrangement is clearly shown in Figs. 1 and 13. One of these valves is shown in cross section in Fig. 12.

Each valve is provided with a valve seat 130 in the nature of a flange which is shaped so that it may be bolted to a conduit and to a housing containing the working parts of the valve. This construction permits the valve seat to be readily removed for cleaning, inspection, and repair. It also provides a simple construction that may be readily and inexpensively manufactured. Each valve seat has a passage 131 therethrough which is arranged to be connected to a supply of water or other cooling liquid for water cooling the valve.

The main valve casing comprises a housing 132 to which is bolted a top piece 133 through which the valve stem 134 projects. This stem is operated by a suitable hand wheel 135 and gears 136 mounted on a frame 137 bolted to the top of the valve. The stem may also be operated from the ground floor by electric motors controlled from any suitable point.

The valve stem carries a valve member 138 of conical shape which co-operates with the valve seat.

This valve construction is particularly efficient in that it prevents the valve being clogged by dust or other foreign matter in the apparatus. Substantially all such foreign matter falls down past the valve seat, due to its downward inclination and the open space therebeneath, and permits the valve to be closed tightly, thereby preventing leaks through the valve. The water cooling of the seat prevents leaks by keeping the valve at a uniform temperature.

The regenerative chambers 18, 18', and 23, 23', are of any suitable construction, being preferably made of sheet metal and containing brick checker work arranged so that gas flowing into the chambers from the pipes 17 and 22 must flow through and around the checker work before it can reach an exit so that the heat of the gas is largely absorbed by the checker work before gas is delivered to the said exit. The gases first enter regenerator 18 or 23 and then pass to the adjacent regenerator 18' or 23' from which it is delivered to the receptacles 19 or 24. By providing a series of small diameter and comparatively high regenerators arranged in tandem, an excellent abstraction of heat is effected, the second regenerator always remaining at a lower temperature than the initial regenerator to which the gas is led from the retorts. Another advantage in making the regenerators of smaller diameter and greater height is to enable their complete assembling and testing in the factory.

The receptacles 19 and 24 are of any suitable shape and construction being preferably made of sheet metal. The cubical contents of each of these receptacles should be the same as the cubical net contents of the regenerative chambers 18, 18', and 23, 23', with the checker work in place so as to prevent the escape of any of the carbon dioxid which is generated in the coal retorts and passes directly to the regenerative chambers and the receptacles. The gas flows directly into the receptacles 19 and 24 and is forced out through the regenerators and coal retorts to the ore chambers, where it is subjected to the action of the metallic oxide.

Discharge pipes 140 and 141 are connected to the top of the receptacles 19 and 24 and automatic relief valves 20 and 25 are located in these pipes so that as the gas is generated and the pressure in the system increases, the excess gas is discharged through the relief valves into suitable storage tanks connected therewith. The receptacles 19 and 24 serve as preliminary storage chambers for collecting the gas preparatory to discharging it into the main storage tanks.

It will thus be seen that a simple and practical apparatus has been provided which will operate continuously and automatically and which conserves the heat generated in producing the gas and utilizes it for carrying on the gas producing process. The arrangement of the apparatus is such that the process is carried on without permitting the entrance of air into the system. The oxygen is supplied to the gas by a medium which may be used over and over again for the same purpose. The heat resulting from the automatic regeneration of this medium is utilized to warm the coal to be charged into the retorts. The apparatus is suitably mounted on a structural steel frame, as illustrated, and forms a very compact, neat, and practical structure.

It is also seen that by constructing the interior of the retorts and combustion chambers by proper laying of the brick a very economical construction is secured, and that the provision of suitably connected units for both the retorts and combustion chambers not only permits a complete assembly and testing of said units at the factory but enables any desired number of units to be connected and disconnected as circumstances of operation demand and in addition permits an absolute balancing of the entire system.

It has been shown that previously known producer gases contain over three-fifths of non-combustible gases. This is due for the most part to the fact that the oxygen required for gasification is taken from the atmosphere and along with it is taken a high percentage of nitrogen which forms a non-combustible element. The gas produced by the present apparatus is free from nitrogen because the process is carried on without permitting the access of air to the system. The oxygen is supplied by means of the metallic oxide in the combustion chambers with the result that the main constituents of the producer gas are carbon monoxid and hydrogen, both combustible and both desirable elements in the gas.

It is to be understood that the structure shown is for purposes of illustration only and that other structures may be devised which come within the spirit and scope of the appended claims.

I claim:

1. Apparatus for producing gas, comprising two sets of coal retorts, means for charging and discharging said retorts without admitting air thereto, chambers for containing metallic oxid, means for charging and discharging said chambers without admitting air thereto, connections between said chambers and retorts communicating with a pump for circulating the gas in the apparatus, and means for retaining and for utilizing the heat of the material discharged from the oxid chambers for heating the coal for charging the retorts.

2. Apparatus for producing gas, comprising two sets of coal retorts, means for charging and discharging said retorts without admitting air thereto, chambers for containing metallic oxid, means for charging and discharging said chambers without admitting air thereto, connections between said chambers and retorts communicating with a pump for circulating the gas in the apparatus, and means for conveying the material discharged from the oxid chambers through conduits surrounded by the coal which is supplied to the retorts, whereby the heat of the material from the oxid chambers is utilized to warm the coal.

3. Apparatus for producing gas, comprising two groups of similar coal retorts, means for charging and discharging said retorts without admitting air thereto, two groups of similar chambers for containing metallic oxid, means for charging and discharging said chambers without admitting air thereto, connections between said chambers and retorts communicating with means for circulating the gas in the apparatus, and means for operatively connecting or disconnecting each of the units of said groups.

4. Apparatus for producing gas, comprising two groups of similar coal retorts, means for charging and discharging said retorts without admitting air thereto, two groups of similar chambers for containing metallic oxid, means for charging and discharging said chambers without admitting air thereto, connections between said chambers and retorts communicating with means for circulating the gas in the apparatus, means for operatively connecting or disconnecting each of the units of said groups, and means for retaining and for utilizing the heat of the material discharged from the oxid chambers for heating the coal for charging the retorts.

5. Apparatus for producing gas, comprising a group of coal retorts, means for charging and discharging said retorts without admitting air thereto, a group of chambers for containing metallic oxid, means for charging and discharging said chambers without admitting air thereto, connections between said chambers and retorts, means for circulating gas therethrough, and means for operatively connecting and disconnecting each of the units of said groups of retorts and chambers to effect a balancing of the system.

6. Apparatus for producing gas, comprising a group of coal retorts, means for charging and discharging said retorts without admitting air thereto, a group of chambers for containing metallic oxid, means for charging and discharging said chambers without admitting air thereto, the number of units in each of said groups being the same, connections between said chambers and retorts, a pair of regenerators arranged in tandem with said groups, means for circulating gas therethrough, and means for connecting and disconnecting each of said units of both said groups to effect balancing of the system.

7. In a gas producing apparatus, an oxid chamber having an outer wall of firebrick, an inner column of firebrick, a series of superposed bricks provided with hopper shaped openings therethrough supported by the brickwork of said outer wall and column, the exit of said openings in adjacent layers thereof being disposed in staggered relation.

In testimony whereof, I sign my name.

CARL LUNDIN.

Witness:
 EDWIN O. JOHNS.